United States Patent
Liu et al.

(10) Patent No.: US 8,144,485 B2
(45) Date of Patent: Mar. 27, 2012

(54) DIRECT CURRENT VOLTAGE CONVERSION CIRCUIT

(75) Inventors: Han-Tao Liu, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 862 days.

(21) Appl. No.: 12/229,639

(22) Filed: Aug. 25, 2008

(65) Prior Publication Data
US 2009/0051221 A1 Feb. 26, 2009

(30) Foreign Application Priority Data
Aug. 24, 2007 (CN) .......................... 2007 1 0076552

(51) Int. Cl.
*H02M 3/335* (2006.01)
(52) U.S. Cl. ................... 363/21.12; 363/21.14
(58) Field of Classification Search ........... 363/21.12, 363/21.13, 21.14, 65, 69, 70
See application file for complete search history.

(56) References Cited

U.S. PATENT DOCUMENTS

| | | | |
|---|---|---|---|
| 7,184,285 B2 | 2/2007 | Karube | |
| 7,313,007 B2 * | 12/2007 | Wu et al. | ........................ 363/65 |
| 7,515,442 B2 * | 4/2009 | Mikulenka et al. | ........ 363/21.12 |
| 2007/0041226 A1 * | 2/2007 | Powers | ...................... 363/21.12 |

FOREIGN PATENT DOCUMENTS

CN  1403894 A  3/2003

OTHER PUBLICATIONS

Maxim, MAX856-MAX859, 3.3V/5V or Adjustable-Output, Step-up DC-DC converters, May 1996, 19-0211, Rev 4, 12 pages.*

* cited by examiner

*Primary Examiner* — Adolf Berhane
*Assistant Examiner* — Nguyen Tran
(74) *Attorney, Agent, or Firm* — Altis Law Group, Inc.

(57) ABSTRACT

A DC voltage conversion circuit (20) of the present disclosure includes a power supply (21), a first output (27), a second output (26), a transformer (22), a first voltage-regulating circuit (25), a second voltage regulating circuit (24), and a step-up DC-DC converter (23). The first voltage-regulating circuit includes a transistor (254) having drain and source electrodes, a first capacitor (252) connected between ground and the first output, and a first diode (251). The first output is connected to ground via the anode and cathode of the first diode, the transformer, and the drain and source electrodes of the transistor in series. The power supply is configured to provide a second voltage to the second output via the transformer and the second voltage-regulating circuit in series. The step-up DC-DC converter is configured to regulate voltages of the first and second outputs according to feedback voltages from the first and second outputs.

20 Claims, 3 Drawing Sheets

DIRECT CURRENT VOLTAGE CONVERSION CIRCUIT

BACKGROUND

1. Field of the Invention

Embodiments of the present disclosure relate to a direct current (DC) voltage conversion circuit, and more particularly, to a DC voltage conversion circuit in a liquid crystal display.

2. General Background

DC voltage conversion circuits are widely used in portable liquid crystal displays to drive power supplies. In general, a portable liquid crystal display needs a stable 8 volt DC power supply and a stable 3.3 volt DC power supply.

In these systems, the DC voltage conversion circuits may include a plurality of voltage regulating circuits to output both positive and negative DC voltage for a liquid crystal display. However, in order to output a negative output voltage, a negative charge pump may be positioned between a power supply and an output of the DC voltage conversion circuit. These negative charge pumps are generally very expensive and create an additional cost for a manufacturer of a liquid crystal display. FIG. 3 shows one example of a DC conversion circuit of the prior art with a first voltage regulating circuit 12 and a second voltage regulating circuit 14. As mentioned above, a negative charge pump 121 may be positioned between a power supply 11 and a first output 15.

From the foregoing, it should be appreciated that there is a need for a DC voltage conversion circuit that generates at least one negative output voltage and at least one positive output voltage. To this end, there is a need for a DC voltage conversion circuit that may generate at least one negative output voltage and at least one positive output voltage whereby the above-described shortcomings are overcome or at least mitigated.

SUMMARY

In one aspect, a direct current voltage conversion circuit comprises: a power supply; a first output; a second output; a transformer; a first voltage-regulating circuit; a second voltage-regulating circuit; and a step-up DC-DC converter. The first voltage-regulating circuit comprises: a transistor including a drain electrode and a source electrode; a first capacitor connected between ground and the first output; and a first diode, having an anode and a cathode, wherein the first output is connected to ground via the anode and cathode of the first diode, the transformer, and the drain and source electrodes of the transistor in series. The power supply is configured to provide a second voltage to the second output via the transformer and the second voltage-regulating circuit in series. The step-up DC-DC converter is configured to receive a first feedback voltage from the first output and regulate a first voltage of the first output by turning on or turning off the transistor according to the first feedback voltage, and is further configured to receive a second feedback voltage from the second output and regulate the second voltage of the second output according to the second feedback voltage.

In another aspect, a direct current voltage conversion circuit comprises: a power supply; a first output; a second output; a transformer; a first voltage-regulating circuit; a second voltage-regulating circuit; and a step-up DC-DC converter. The first voltage-regulating circuit comprises: a transistor including a drain electrode and a source electrode; a first capacitor connected between ground and the first output; and a first diode, having an anode and a cathode, the first output being connected to ground via the anode and cathode of the first diode, the transformer, and the drain and source electrodes of the transistor in series. The power supply is configured to provide a second voltage to the second output via the transformer and the second voltage-regulating circuit in series. The step-up DC-DC converter comprises: a first feedback terminal connected to the first output; a second feedback terminal connected to the second output; a first control output connected to the gate electrode of the transistor; and a second control output connected to the second voltage-regulating circuit.

These and other objects and advantages of the present disclosure will become more apparent from the following description of certain inventive embodiments taken in conjunction with the accompanying drawings.

DETAILED DESCRIPTION

Figure 1:
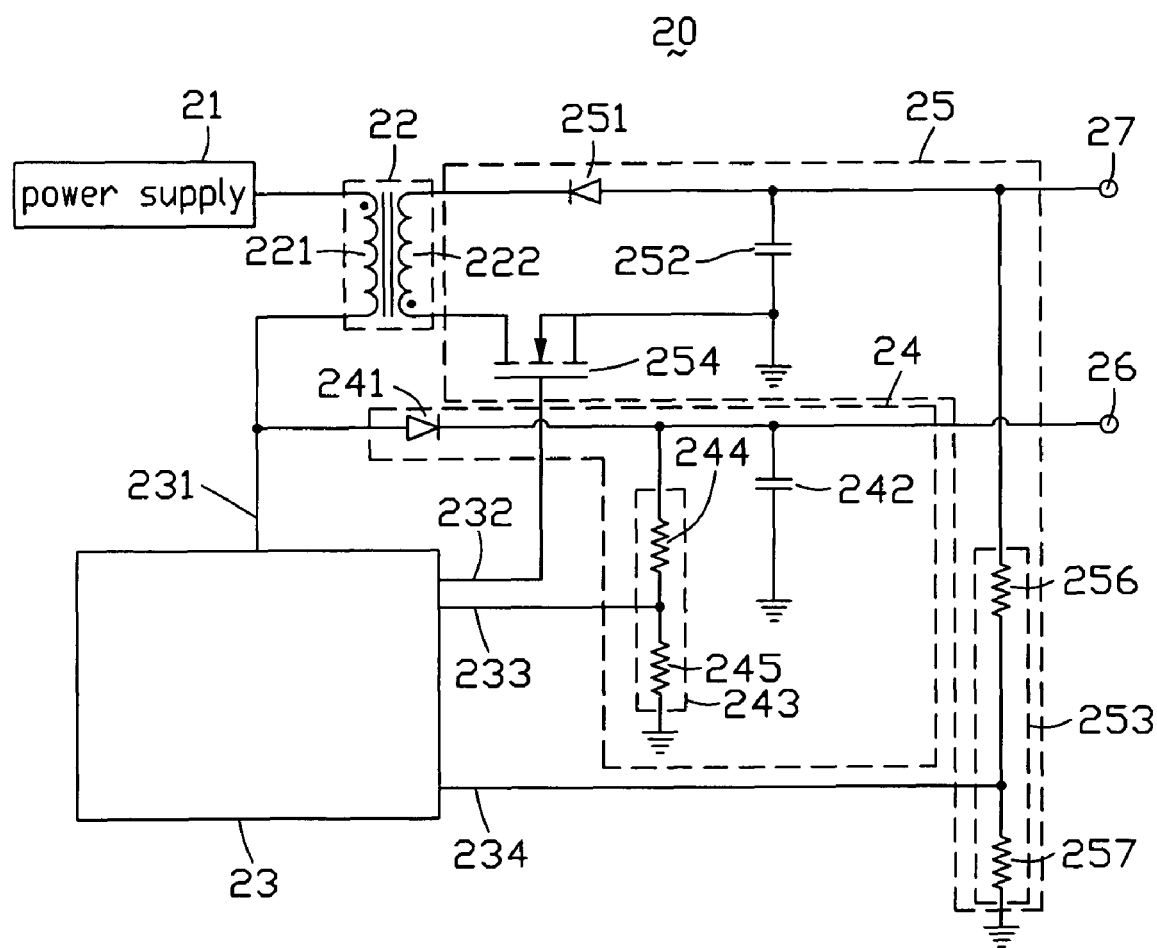
FIG. 1 is a schematic of one embodiment of a DC voltage conversion circuit of the present disclosure.

FIG. 1 is a schematic of one embodiment of a DC voltage conversion circuit 20 of the present disclosure. In one embodiment, the DC voltage conversion circuit 20 may include a power supply 21, a transformer 22, a step-up DC-DC converter 23, a first voltage-regulating circuit 25, a second voltage-regulating circuit 24, and a plurality of outputs, such as a first output 27 and a second output 26. The transformer 22 may include a primary coil 221 and a secondary coil 222. The secondary coil 222 provides a first voltage to the first output 27 via the first voltage-regulating circuit 25. The power supply 21 provides a second voltage to the second output 26 via the primary coil 221 and the second voltage-regulating circuit 24 in series.

In one embodiment, the first voltage-regulating circuit 25 may include a first diode 251, a first capacitor 252, a transistor 254, and a first feedback branch circuit 253. In one particular embodiment, the first output 27 is connected to ground via the anode of the first diode 251, the cathode of the first diode 251, one end of the secondary coil 222, the other end of the secondary coil 222, the drain electrode of the transistor 254, and the source electrode of the transistor 254 connected in series. The first capacitor 252 is connected with the first feedback branch circuit 253 in parallel, and is also connected between ground and the first output 27. The first feedback branch circuit 253 includes a first resistor 256 and a second resistor 257 connected in series. However, it may be understood that the first feedback branch 253 may include other resistive elements in addition to resistors, such as inductors.

In one embodiment, the second voltage-regulating circuit 24 includes a second diode 241, a second capacitor 242, and a second feedback branch circuit 243. In one particular embodiment, the power supply 21 is connected to the second output 26 via the primary coil 221 of the transformer 22, the anode of the second diode 241, and the cathode of the second diode 241 in series. The second capacitor 242 is connected with the second feedback branch circuit 243 in parallel, and is also connected between ground and the second output 26. The second feedback branch circuit 243 includes a third resistor 244 and a fourth resistor 245 connected in series. Likewise, it may be understood that the second feedback branch 243 may include other resistive elements in addition to resistors, such as inductors.

The step-up DC-DC converter 23, in one embodiment, may include a first control output 232, a second control output 231, a first feedback terminal 234, and a second feedback terminal 233. The first feedback terminal 234 is configured to receive a first feedback voltage from the first feedback branch circuit 253. The second feedback terminal 233 is configured to receive a second feedback voltage from the second feedback branch circuit 243. The first control output 232 is connected to the gate electrode of the transistor 254. The first feedback terminal 234 is connected to a node between the first resistor 256 and the second resistor 257. The second feedback terminal 233 is connected to a node between the third resistor 244 and the fourth resistor 245.

The step-up DC-DC converter 23 controls the first control output 232 to output a high voltage or a low voltage according to the first feedback voltage received by the first feedback terminal 234. The output of the high voltage or low voltage causes the transistor 254 to switch on or switch off. The step-up DC-DC converter 23 further regulates a duty ratio of a pulse signal outputted by the second control output 231 according to the second feedback voltage received by the second feedback terminal 233, so as to regulate an energy storage time of the primary coil 221 of the transformer 22. The pulse signal outputted by the second control output 231 has an initial duty ratio.

In one embodiment, the step-up DC-DC converter 23 may be an MAX856 type IC. In such a case, the first control output 232 is an LBO pin of the MAX856 type IC, the first feedback terminal 234 is an LBI pin of the MAX856 type IC, the second control output 231 is an LX pin of the MAX856 type IC, and the second feedback terminal 233 is an FB pin of the MAX856 type IC.

In one embodiment, the power supply 21 may, for example, be a 1.5 volt DC supply. In one example, the first voltage of the first output 27 is equal to −8 volts. The second voltage of the second output 26 is equal to 3.3 volts. In one embodiment, resistance values of the first and third resistors 256, 244 may be both equal to 10000 ohms, while a resistance value of the second resistor 257 may be equal to 1870 ohms, and a resistance value of the fourth resistor 245 may be 6200 ohms. Additionally, in one embodiment, a capacitance value of the first capacitor 252 may be equal to 68 microfarads and a capacitance value of the second capacitor 242 may be equal to 100 microfarads. However, it may be appreciated that the voltage of the power supply, resistances of the resistors, and capacitances of the capacitors may vary depending on the application and the device itself.

The working principle of the DC voltage conversion circuit 20 is as follows:

When the DC voltage conversion circuit 20 starts to work, the second control output 231 of the step-up DC-DC converter 23 outputs a pulse signal having an initial duty ratio. In one embodiment, during a low level of the pulse, the pulse signal may turn off the second diode 241, such that the power supply 21 and the primary coil 221 form a loop. The primary coil 221 generates an electromotive force, therefore the secondary coil 222 of the transformer 22 experiences an induced electromotive force from the primary coil 221. In one embodiment, during a high level of the pulse, the pulse signal turns on the second diode 241, such that the power supply 21 and the primary coil 221 of the transformer 22 may charge the second capacitor 242 via the anode and cathode of the second diode 241, and further provide a second voltage to the second output 26. At the same time, the second voltage is provided to the second feedback terminal 233 of the step-up DC-DC converter 23.

In one embodiment, if the second voltage is less than 3.3 volts, the step-up DC-DC converter 23 may decrease the duty ratio of the pulse signal outputted through the second control output 231 after the second voltage is provided to the second feedback terminal 233 of the step-up DC-DC converter 23. By decreasing the duty ratio of the pulse signal, the energy storage time of the primary coil 221 may be increased thus also increasing the second voltage of the second output 26.

In one embodiment, if the second voltage is greater than 3.3 volts, the step-up DC-DC converter 23 may increase the duty ratio of the pulse signal outputted through the second control output 231 after the second voltage is provided to the second feedback terminal 233 of the step-up DC-DC converter. By increasing the duty ratio of the pulse signal, the energy storage time of the primary coil 221 may be decreased thus also decreasing the second voltage of the second output 26.

In one embodiment, the first voltage of the first output 27 is equal to zero at the moment when the DC voltage conversion circuit 20 begins to operate. The zero voltage is provided to the first feedback terminal 234 of the step-up DC-DC converter 23 via the first feedback branch circuit 253, such that the step-up DC-DC converter 23 controls the first control output 232 to output a high voltage to turn on the transistor 254. Because the secondary coil 222 of the transformer 22 experiences the induced electromotive force when the primary coil 221 of the transformer 22 generates the electromotive force, the secondary coil 222 charges the first capacitor 252 via the drain and source electrodes of the transistor 254. Accordingly, the first voltage of the first output 27 increases due to the charging of the first capacitor 252.

In one embodiment, if the first voltage is greater than −8 volts, then the step-up DC-DC converter 23 may control the first control output 232 to output a low voltage after the first voltage is provided to the first feedback terminal 234 in order to turn off the transistor 254. Thus, the secondary coil 222 of the transformer 22 does not charge the first capacitor 252, and at the same time the first capacitor 252 discharges through the first feedback branch circuit 253, in order to decrease the first voltage of the first output 27.

It may be understood that the first voltage is not limited to 3.3 volts, and the second voltage is not limited to −8 volts. The first and second voltages may be adjusted by adjusting parameters of electronic components of the DC voltage conversion circuit 20. As non-limiting examples, configurations as to resistors, capacitors, inductance, and number of coils for the transformer 22 may be changed depending on the application without departing from the spirit of the invention.

In summary, the first voltage-regulating circuit 25 of the DC voltage conversion circuit 20 includes the transformer 22, the transistor 254, and the first diode 251 which can convert the 1.5 volt voltage provided by the power supply and deliver the −8 volt converted DC voltage to the first output 27. Thus, unlike a conventional DC voltage conversion circuit, an expensive low noise negative output charge pump voltage regulator circuit is not required. Therefore, the DC voltage conversion circuit 20 reduces manufacturing costs.

Figure 2:
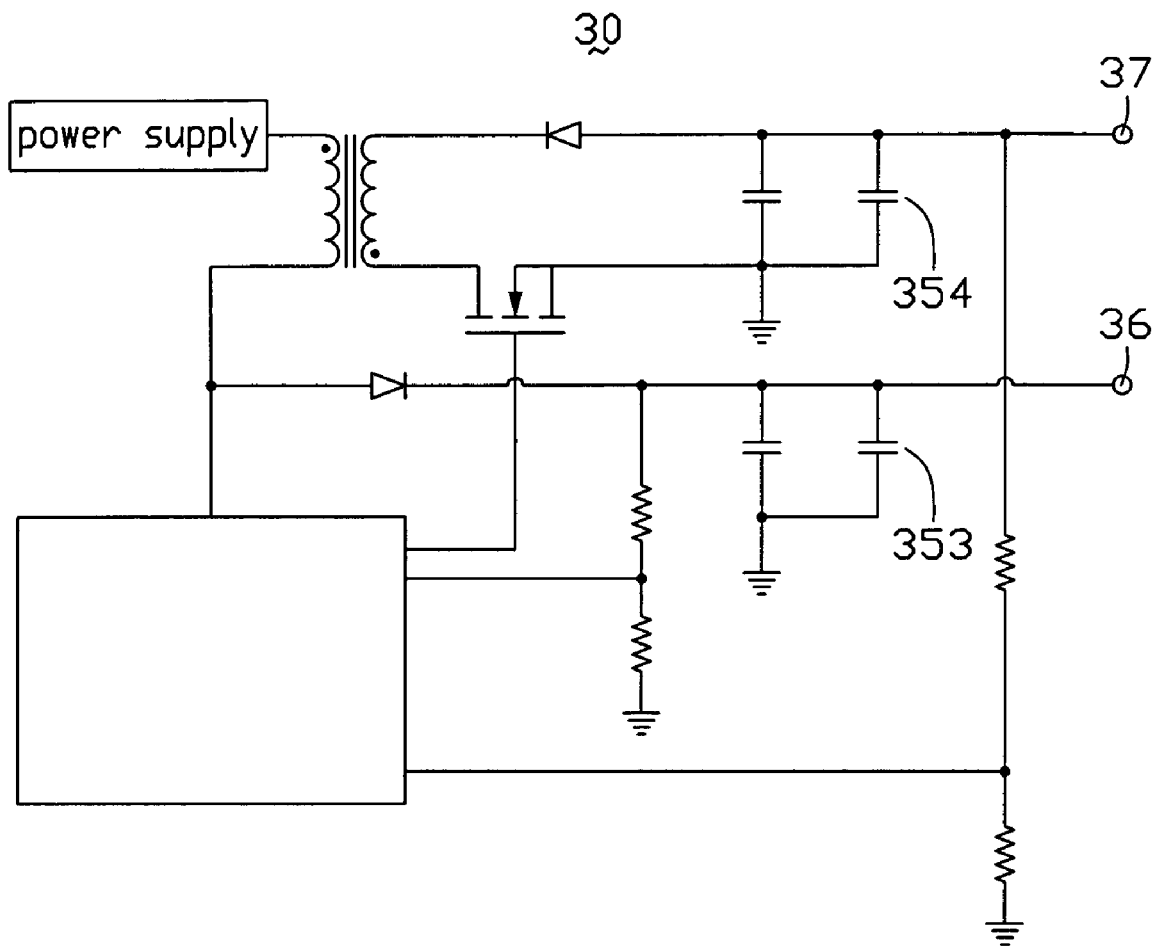
FIG. 2 is a schematic of another embodiment of a DC voltage conversion circuit of the present disclosure.
Figure 3:
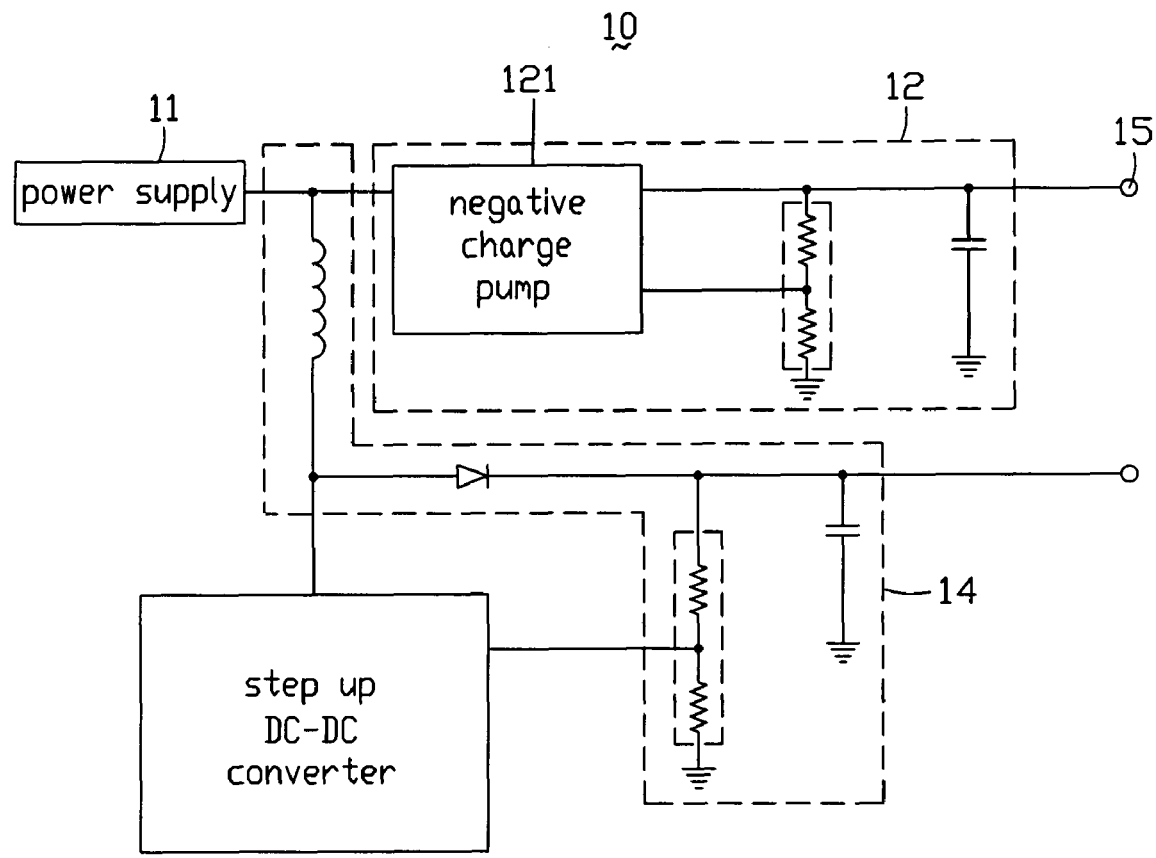
FIG. 3 is a schematic of one embodiment of a DC voltage conversion circuit of the prior art.

FIG. 2 is a schematic of another embodiment of a DC voltage conversion circuit 30 of the present disclosure. In one embodiment, the DC voltage conversion circuit 30 includes a third capacitor 354 and a fourth capacitor 353. The third capacitor 354, in one embodiment, is connected between ground and a first output 37, and is configured to filter noise interference of a first voltage of the first output 37. In one embodiment, the fourth capacitor 353 is connected between ground and a second output 36, and is configured to filter noise interference of a second voltage of the second output 36.

It is to be further understood that even though numerous characteristics and advantages of the present embodiments have been set out in the foregoing description, together with details of the structures and functions of the embodiments, the disclosure is illustrative only; and that changes may be made in detail, especially in matters of shape, size and arrangement of parts within the principles of the invention to the full extent indicated by the broad general meaning of the terms in which the appended claims are expressed.

What is claimed is:

1. A direct current voltage conversion circuit comprising:
    a power supply;
    a first output;
    a second output;
    a transformer comprising a primary coil and a secondary coil;
    a first voltage-regulating circuit comprising:
        a transistor including a drain electrode and a source electrode;
        a first capacitor connected between ground and the first output; and a first diode, having an anode and a cathode, wherein the first output is capable of being connected to ground via the anode and cathode of the first diode, the transformer, and the drain and source electrodes of the transistor in series;
    a second voltage-regulating circuit, wherein the power supply is configured to provide a second voltage to the second output via the transformer and the second voltage-regulating circuit in series, the second voltage-regulating circuit comprises a second diode, the primary coil of the transformer and the second diode is connected in series between the power supply and the second output; and
    a step-up DC-DC converter configured to receive a first feedback voltage from the first output and regulate a first voltage of the first output by turning on or turning off the transistor according to the first feedback voltage, and further configured to receive a second feedback voltage from the second output and regulate the second voltage of the second output according to the second feedback voltage.

2. The direct current voltage conversion circuit in claim 1, wherein the second voltage-regulating circuit further comprises a second capacitor, the second capacitor being connected between ground and the second output, and the power supply being connected to the second output via the transformer, the anode of the second diode, and the cathode of the second diode in series.

3. The direct current voltage conversion circuit in claim 2, wherein the first output is connected to ground via the anode of the first diode, the cathode of the first diode, the secondary coil, the drain electrode of the transistor, and the source electrode of the transistor in series.

4. The direct current voltage conversion circuit in claim 3, wherein the step-up DC-DC converter comprises a first control output, a second control output, a first feedback terminal, and a second feedback terminal, the first control output being connected to the anode of the second diode, the second control output being connected to a gate electrode of the transistor, the first feedback terminal being configured to receive the first feedback voltage from the first output, and the second feedback terminal being configured to receive the second feedback voltage from the second output.

5. The direct current voltage conversion circuit in claim 4, further comprising a first feedback branch circuit, the first feedback branch circuit being connected between ground and the first output and comprising a first resistor and a second resistor connected in series, the first feedback terminal receiving the first feedback voltage from the first output via the first resistor.

6. The direct current voltage conversion circuit in claim 5, further comprising a second feedback branch circuit, the second feedback branch circuit being connected between ground and the second output and comprising a third resistor and a fourth resistor connected in series, the second feedback terminal receiving the second feedback voltage from the second output via the third resistor.

7. The direct current voltage conversion circuit in claim 6, further comprising a third capacitor and a fourth capacitor, the third capacitor being connected between ground and the first output and configured to filter noise interference of the first voltage of the first output, the fourth capacitor being connected between ground and the second output and configured to filter noise interference of the second voltage of the second output.

8. The direct current voltage conversion circuit in claim 2, wherein the power supply is a 1.5 volt direct current power supply.

9. The direct current voltage conversion circuit in claim 8, wherein the first voltage is equal to −8 volts, and the second voltage is equal to 3.3 volts.

10. A direct current voltage conversion circuit comprising:
    a power supply;
    a first output;
    a second output;
    a transformer comprising a primary coil and a secondary coil;
    a first voltage-regulating circuit comprising:
        a transistor including a gate electrode, a drain electrode and a source electrode;
        a first capacitor connected between ground and the first output; and
        a first diode, having an anode and a cathode, the first output being connected to ground via the anode and cathode of the first diode, the transformer, and the drain and source electrodes of the transistor in series;
    a second voltage-regulating circuit, the power supply configured to provide a second voltage to the second output via the transformer and the second voltage-regulating circuit in series, the second voltage-regulating circuit comprising a second diode, the primary coil of the transformer and the second diode being connected in series between the power supply and the second output; and
    a step-up DC-DC converter comprising: a first feedback terminal connected to the first output; a second feedback terminal connected to the second output; a first control output connected to the gate electrode of the transistor; and a second control output connected to the second voltage-regulating circuit.

11. The direct current voltage conversion circuit in claim 10, wherein the first output is connected to ground via the anode and cathode of the first diode, the secondary coil, and the drain and source electrodes of the transistor in series.

12. The direct current voltage conversion circuit in claim 10, wherein the power supply is a 1.5 volt power supply.

13. The direct current voltage conversion circuit in claim 12, wherein a voltage of the first output is equal to −8 volts, and a voltage of the second output is equal to 3.3 volt.

14. The direct current voltage conversion circuit in claim 3, wherein the secondary coil of the transformer is connected between the anode of the first diode and the drain electrode of the transistor, and the source electrode of the transistor is grounded.

15. The direct current voltage conversion circuit in claim 14, wherein the first capacitor is connected between the source electrode of the transistor and the first output.

16. The direct current voltage conversion circuit in claim 11, wherein the secondary coil of the transformer is connected between the anode of the first diode and the drain electrode of the transistor, and the source electrode of the transistor is grounded.

17. The direct current voltage conversion circuit in claim 15, wherein the first capacitor is connected between the source electrode of the transistor and the first output.

18. An apparatus, comprising:
a transformer comprising a primary coil and a secondary coil, the primary coil comprising two ends;
a first voltage-regulating circuit comprising a first diode, a first capacitor and a transistor cooperatively converting a positive power voltage received by the transformer to a negative output voltage, wherein a source electrode of the transistor is grounded, a drain electrode of the transistor is connected to a cathode of the first diode via the secondary coil of the transformer, an anode of the first diode is connected to a first output, and is grounded via the first capacitor;
a second voltage-regulating circuit comprising a second diode and a second capacitor cooperatively converting the positive power voltage received by the transformer to a positive output voltage, wherein an anode of the second diode is connected to one end of the primary coil of the transformer, the other end of the primary coil is configured to receive a DC voltage, and a cathode of the second diode is connected to a second output, and is grounded via the second capacitor.

19. The apparatus of claim 18, wherein a gate electrode of the transistor is configured to receive a control signal from a single-chip DC-DC converter, the single-chip DC-DC converter provides the control signal to switch on or switch off the transistor in accordance with a first feedback signal fed back from the first output, and provide a pulse signal with a duty ratio corresponding to a second feedback signal fed back from the second output.

20. The apparatus of claim 19, wherein the single-chip DC-DC converter is a step-up DC-DC converter enabling each of the negative output voltage and the positive output voltage to have an amplitude greater than the positive power voltage received by the transformer.

* * * * *